United States Patent [19]

Betin et al.

[11] Patent Number: 5,729,380
[45] Date of Patent: Mar. 17, 1998

[54] LOOP PHASE-CONJUGATE MIRROR FOR DEPOLARIZED BEAMS

[75] Inventors: Alexander A. Betin, Calabasas; Metin S. Mangir, Santa Monica, both of Calif.

[73] Assignee: Hughes Electronics, Los Angeles, Calif.

[21] Appl. No.: 741,275

[22] Filed: Oct. 30, 1996

[51] Int. Cl.$^6$ .................................................... G02B 26/08
[52] U.S. Cl. ........................ 359/300; 359/302; 359/303
[58] Field of Search ................................. 359/298, 300, 359/301, 302, 303

[56] References Cited

U.S. PATENT DOCUMENTS

| | | | |
|---|---|---|---|
| 5,113,282 | 5/1992 | O'Merra et al. | 359/300 |
| 5,303,032 | 4/1994 | Uesu et al. | 359/300 |
| 5,396,368 | 3/1995 | Khoshnevisan et al. | 359/300 |
| 5,535,024 | 7/1996 | Khoury et al. | 359/300 |

OTHER PUBLICATIONS

John H. Marburger, "Improvements upon the Simple Theory of Degenerate Four-Wave Mixing", *Optical Phase Conjugation*, Ed. Robert A. Fisher Academic Press, Florida, 1983, pp. 99–125.

Bel'dyugin et al., "Wavefront reversal of optical radiation using feedback in four-wave interaction", *Soviet Journal of Quantum Electronics*, vol. 14, No. 5, 1984, pp. 602–605.

A.A. Betin et al., "Structure of lasing modes generated as a result of a four-wave inter-action with feedback", *Sovient Journal of Quantum Electronics*, vol. 18, No. 5, 1988, pp. 657–663.

N.G. Basov et al., "Inversion of wavefront in SMBS of depolarized pump", *JETP Letters*, vol. 28, 1978, pp. 197–201.

J.M. Eggleston et al, "Slab–geometry Nd: glass laser performance studies", *Optics Letters*, vol. 7, No. 9, Sep. 1982, pp. 405–407.

M.E. Brodov et al., "Eight-pass neodymium glass slab amplifier with a waveguide and with phase conjugation", *Soviet Journal of Quantum Electronics*, vol. 17, No. 10, Oct. 1987, pp. 1265–1266.

A.A. Betin et al., "Selection of a phase–conjugate wave in an oscillator based on a four–wave interaction with feedback in an extended nonlinear medium", *Quantum Electronics*, vol. 24, No. 3, 1994 pp. 219–222.

A.A. Betin et al., "Reflection of speckle-inhomogenous $CO_2$ laser radiation under four–wave interaction conditions with feedback", *Quantum Electronics*, vol. 24, No. 1, 1994, pp. 59–62.

*Primary Examiner*—Frank G. Font
*Assistant Examiner*—Robert Kim
*Attorney, Agent, or Firm*—V. D. Diraoswamy; W. K. Denson-Low

[57] ABSTRACT

A loop four-wave mixing phase conjugator that can be used with depolarized signal beams comprises a polarization separator, a polarization mixer, an optical diode, a gain medium and relay optics that together form a unidirectional laser resonator. In operation, the polarization separator separates a signal beam $\epsilon_1$ into orthogonally polarized signal beam components $\epsilon_{11}$ and $\epsilon_{12}$ and directs them to a nonlinear medium. The components propagate through the nonlinear medium and emerge as loop beam $\epsilon_2$, with orthogonally polarized components $\epsilon_2$ and $\epsilon_{22}$. The polarization mixer mixes the energy from the two orthogonally polarized loop beam components, and relay optics direct the loop beam components back to the nonlinear medium at an angle with respect to the input beam. The loop beam components intersect and optically interfere with signal beam components $\epsilon_{11}$ and $\epsilon_{22}$ in the nonlinear medium to form gratings. The optical diode and gain medium are positioned in the optical loop so that an oscillation beam $\epsilon_3$ builds up from optical noise in the resonator and oscillates in a direction counter to the propagation direction of loop beam components $\epsilon_{21}$ and $\epsilon_{22}$. A portion of oscillation beam $\epsilon_3$ is transmitted by the gratings, and exits the optical loop as an output beam $\epsilon_4$. $\epsilon_3$ is phase conjugate to the input beam $\epsilon_1$ in both the spatial and polarization senses.

12 Claims, 2 Drawing Sheets

LOOP PHASE-CONJUGATE MIRROR FOR DEPOLARIZED BEAMS

GOVERNMENT RIGHTS

This invention was made with Government support under Agreement No. MDA972-94-3-0020 awarded by ARPA. The Goverment has certain rights in this invention. The Government has certain rights in this invention.

BACKGROUND OF THE INVENTION

1. Field of the Invention

This invention relates to phase-conjugate mirrors, and more particularly to a loop-configuration, four-wave mixing phase conjugate mirror that can operate with depolarized optical beams.

2. Description of the Related Art

Optical phase conjugation is a well known technique that utilizes nonlinear optical effects to precisely reverse both the direction of propagation and the overall phase factor for each plane wave in an arbitrary beam of light.

Four-wave mixing is a common and well known nonlinear process for achieving phase conjugation. For an introduction to phase conjugation via four-wave mixing, see John H. Marburger, "improvements upon the Simple Theory of Degenerate Four-Wave Mixing", in *Optical Phase Conjugation*, Ed. Robert A. Fisher, Academic Press, Florida (1983), pages 99–125. Phase conjugation by four-wave mixing requires two pump beams in addition to the input beam.

Loop four-wave mixing phase conjugators, described in I. M. Bel'dyugin, M. G. Galushkin, and E. M. Zemskov, "Wavefront reversal of optical radiation using feedback in four-wave interaction", *Soviet Journal of Quantum Electronics*, Vol. 14, No. 5, pages 602–605(1984) and A. A. Betin and N. Yu. Rusov, "Structure of lasing modes generated as a result of a four-wave interaction with feedback", *Soviet Journal of Quantum Electronics*, Vol. 18, No. 5, pages 657–663 (1988), utilize a simple architecture by generating the multiple pumping beams from the signal beam to be phase conjugated. Thus, a separate source for the pump beams is eliminated.

Most phase conjugate mirrors, including four-wave mixing phase conjugators, can generate a phase conjugate of the signal beam only when the signal beam is uniformly and linearly polarized. If the signal beam is elliptically polarized or if different parts of the signal beam have different polarization states (including depolarized beams), the output beam is not a true phase conjugate of the signal beam.

A modification that will allow a phase conjugator to operate with depolarized beams is described in N. G. Basov et al., "Inversion of wavefront in SMBS of a depolarized pump", *JETP Letters*, Vol. 28, pages 197–201 (1978). In this approach, the signal beam is split into two orthogonally polarized components and the polarization of one component is rotated by 90 degrees so that both components have the same polarization state. Both components are then directed into the phase conjugate mirror. With this approach, the phase conjugate mirror effectively receives only one polarization state.

A problem with this approach results from the angular separation between the two signal beam components. Often the signal beam to be phase conjugated is highly aberrated and exhibits relatively high divergence. The phase conjugate mirror must accept the entire signal beam in order to generate a phase conjugate output beam with high fidelity. In Basov's approach, the signal beam is split into two beams that are then directed to the phase conjugator. Because one of the beams must be passed through a polarization rotator to rotate its polarization by 90 degrees, the angular separation between the beams at the conjugator is significant. Therefore, the aperture of the phase conjugator must be large enough to accept two beams that are not only highly diverging, but that are also are angularly separated by a significant amount.

The Basov approach is particularly incompatible in loop phase conjugate mirrors because of the relatively small apertures of the additional optical components used in the loop. In addition if there are depolarizing elements within the loop, then phase conjugation will not work either with this scheme.

SUMMARY OF THE INVENTION

In view of the above problems, the present invention provides a loop four-wave mixing phase conjugator that can be used with depolarized signal beams.

This is accomplished by utilizing a polarization separator that separates a signal beam into two orthogonally polarized components, a polarization mixer that mixes the energy from the two orthogonally polarized components, and an optical diode that is configured to work with the two orthogonally polarized beams. The optical diode is not essential; in some special cases the loop may work without it. A separate loop is provided for each of the orthogonal polarization components of the input beam. Each loop is constructed to phase conjugate and thus correct for the spatial aberrations present in one of the orthogonal polarization directions. To work with depolarized beams, (i.e., vector phase conjugation) it is not sufficient only to correct spatial aberrations; the phase difference between the two orthogonally polarized output beams must also be the same as the two orthogonally polarized input beams or the output beam's polarization will not be conjugated. To achieve this phase locking requirement of depolarized input beams, the two separate loops are coupled. This is accomplished with a polarization mixing method in which part of the beam polarized along one axis is taken and added to the beam that is polarized along the orthogonal axis.

The polarization separator separates the signal beam into orthogonally polarized signal beam components and directs the beam components to a nonlinear medium. Sometimes it is required to have equal amounts of energy in orthogonally polarized components of the input beam in the cell. This can be accomplished by placing and adjusting a half-wave plate in the input beam path before it enters the loop. The components propagate through the nonlinear medium and emerge as a loop beam with orthogonally polarized components. The polarization mixer mixes the energy from the two orthogonally polarized loop beam components, while relay optics direct the loop beam components back to the nonlinear medium. The loop beam components intersect and optically interfere with the signal beam components in the nonlinear medium to form refractive index gratings. The relay optics and refractive index gratings form an optical loop.

The optical diode is positioned in the optical loop to produce a non-reciprocal loss in the loop that is greater for beams propagating along the direction of the orthogonally polarized loop beam components than for optical beams propagating in the opposite direction. In addition, an optical gain medium is positioned in the loop to provide optical gain for beams propagating in the loop.

The optical gain medium converts the optical loop into a ring laser resonator. The optical diode and gain medium are positioned in the loop so that an oscillation beam builds up from optical noise in the resonator and oscillates in a direction counter to the propagation direction of the orthogonally polarized loop beam components A portion of the oscillation beam is transmitted by the refractive index gratings, and exits the optical loop as phase conjugate output beam.

These and other features and advantages of the invention will be apparent to those skilled in the art from the following detailed description of preferred embodiments, taken together with the accompanying drawings, in which:

DETAILED DESCRIPTION OF THE INVENTION

Figure 1:
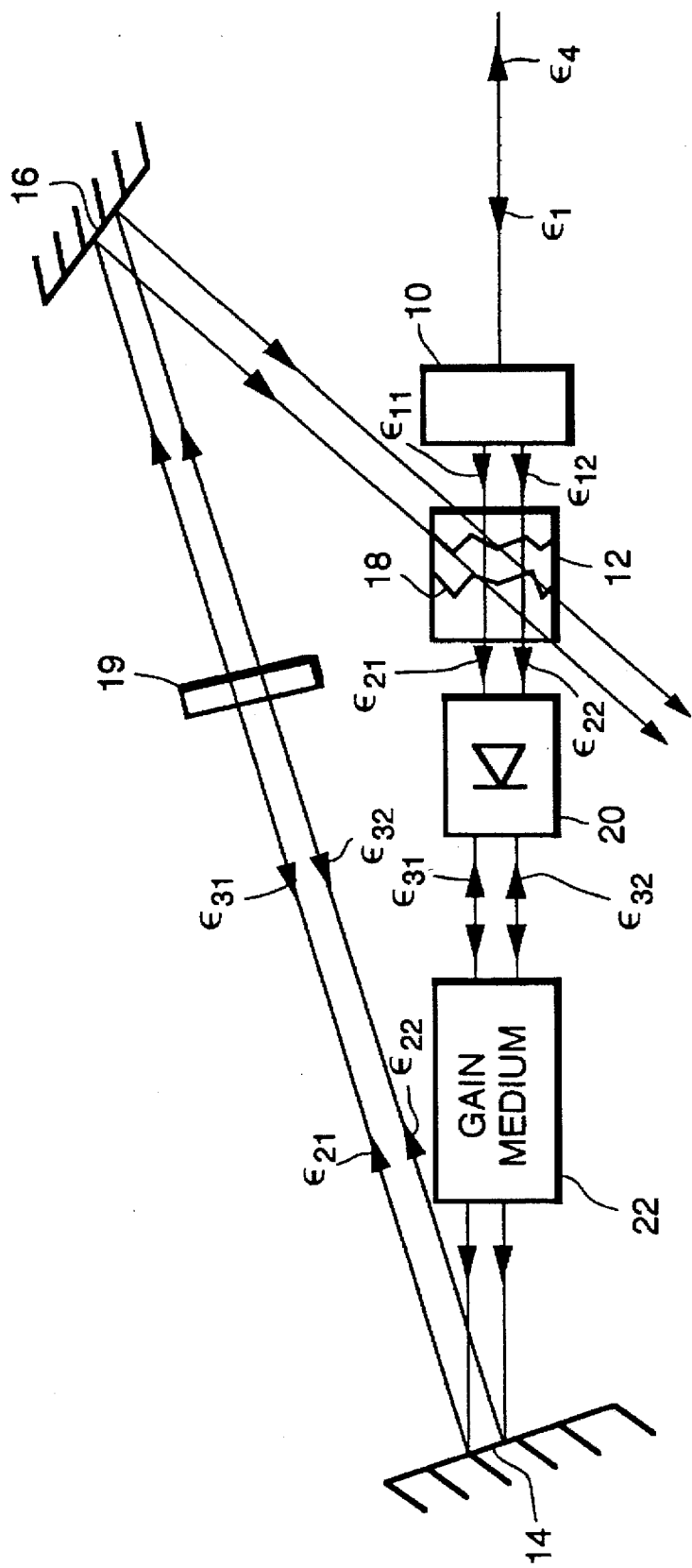
FIG. 1 is schematic diagram illustrating the basic principles of the invention.

FIG. 1 illustrates the basic principles of the invention. A polarization separator 10 splits a signal beam $\epsilon_1$ into two orthogonally polarized components $\epsilon_{11}$ and $\epsilon_{12}$ and directs them to a nonlinear medium 12. The signal beam components $\epsilon_{11}$ and $\epsilon_{12}$ propagate through the nonlinear medium 12 and emerge as loop beam components $\epsilon_{21}$ and $\epsilon_{22}$. Relay optics 14 and 16 direct loop beam components $\epsilon_{21}$ and $\epsilon_{22}$ back to the nonlinear medium 12 so that they optically interfere with signal beam components $\epsilon_{11}$ and $\epsilon_{12}$ in the nonlinear medium 12 and form refractive index gratings 18. (The invention can also be implemented with other mechanisms such as gain gratings.) A polarization mixer 19 mixes the energy from the orthogonally polarized loop beam components $\epsilon_{21}$ and $\epsilon_{22}$. The purpose of this polarization mixing will be discussed below.

Optical diode 20 and optical gain medium 22 are positioned in the optical loop formed by relay optics 14 and 16, and refractive index gratings 18. The optical diode 20 produces a non-reciprocal optical loss in the loop that is greater for beams propagating along the propagation direction of loop beam components $\epsilon_{21}$ and $\epsilon_{22}$ than for optical beams propagating in the opposite direction. Therefore, loop beam components $\epsilon_{21}$ and $\epsilon_{22}$ are highly attenuated as they pass through diode 20. The optical gain medium 22 provides optical gain to any optical beam that passes through it, and converts the optical loop into a ring laser resonator.

In operation an oscillation beam $\epsilon_3$, with orthogonally polarized components $\epsilon_{31}$ and $\epsilon_{32}$, builds up from optical noise in the resonator/loop and oscillates in a direction counter to the propagation direction of loop beam components $\epsilon_{21}$ and $\epsilon_{22}$ due to the non-reciprocal loss introduced by optical diode 20. Portions of beam components $\epsilon_{31}$ and $\epsilon_{32}$ are diffracted by gratings 18 and remain in the optical loop, while other portions are transmitted through the gratings 18, and exit the optical loop as phase conjugate output beam $\epsilon_4$.

Figure 2:
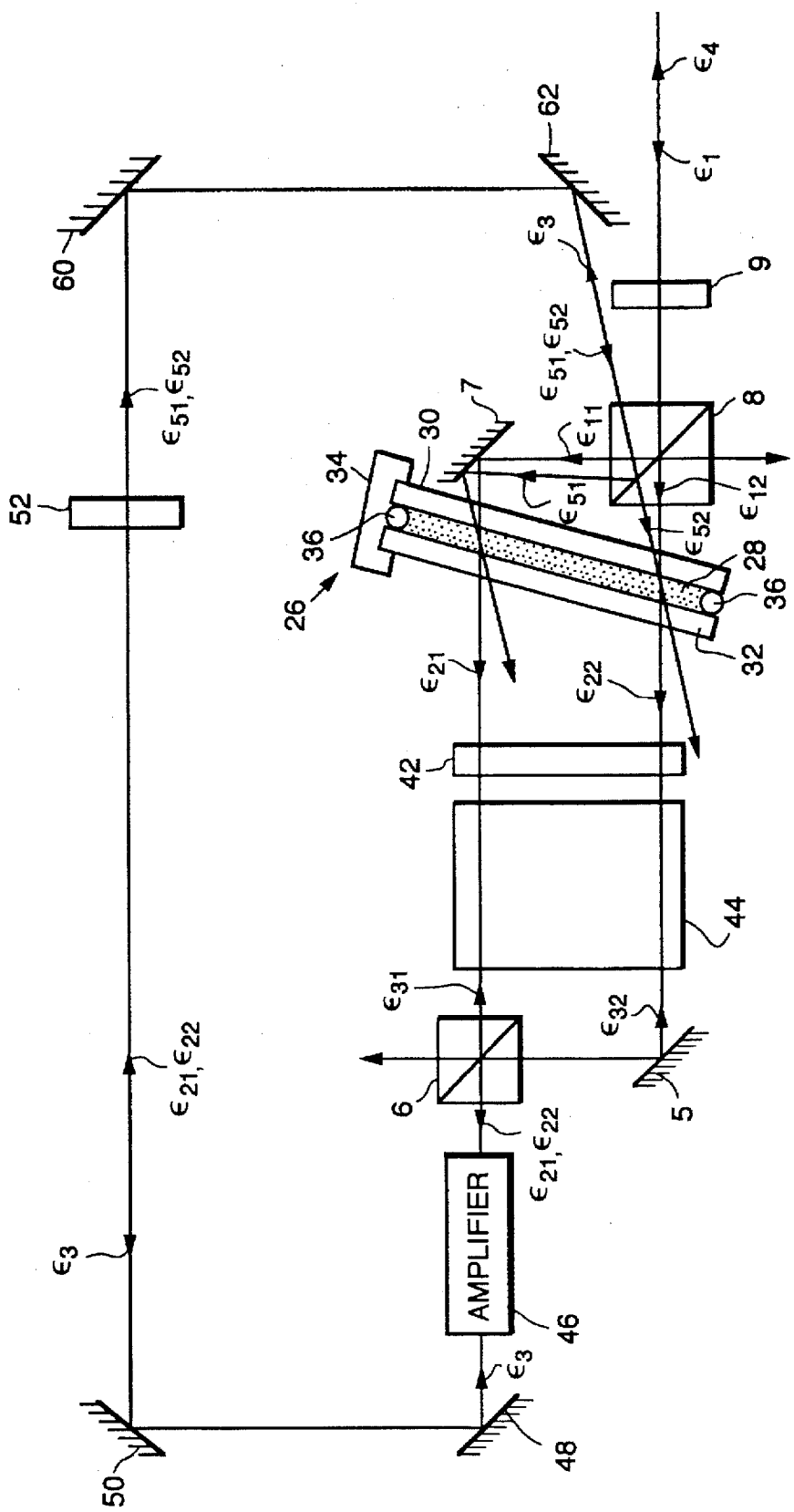
FIG. 2 is a schematic diagram illustrating a preferred embodiment of the invention.

FIG. 2 illustrates a preferred embodiment of the invention. The signal beam $\epsilon_1$ passes through a half-wave plate 9 and then a polarization separator 8, that splits signal beam $\epsilon_1$ into orthogonally polarized components $\epsilon_{11}$ and $\epsilon_{12}$, respectively. The deflected beam $\epsilon_{11}$ is directed by a mirror 7 onto a path parallel to beam $\epsilon_{12}$. The signal beam components $\epsilon_{11}$ and $\epsilon_{12}$ propagate through nonlinear cell 26.

The nonlinear cell 26 is preferably comprised of a front window 30 and back window 32, with a nonlinear medium 28 sandwiched between them. The windows are preferably held together with a clamp 34, and spacers 36 are preferably used to provide control over the thickness of the nonlinear medium 28.

Any type of nonlinear medium 28 upon which gratings can be written may be used in the cell 26. However, in the preferred embodiment an absorptive nonlinear medium 28 with a thermal-based nonlinearity is used. For a 1 micron wavelength signal beam $\epsilon_1$, the nonlinear material 28 is preferably copper nitrate in an acetone base, with the amount of copper nitrate and the thickness of the nonlinear medium 28 adjusted so that the signal beam $\epsilon_1$ experiences approximately 15 percent absorption as it passes through the medium 28. Other possible materials include Cr:YAG and filter glass doped to absorb at the wavelength of interest. The windows 30 and 32 should be optically transparent at the signal beam $\epsilon_1$ wavelength, and should also be good heat conductors. For a 1 micron signal beam $\epsilon_1$, sapphire is the preferred material for windows 30 and 32.

The signal beam components $\epsilon_{11}$ and $\epsilon_{12}$ pass through the nonlinear medium 28, and exit the cell 26 as loop beam components $\epsilon_{21}$ and $\epsilon_{22}$. A reciprocal polarization rotator, preferably a half-wave plate 42, and a Faraday rotator 44 are positioned after the cell; the polarization rotator may either precede or follow the Faraday rotator. A mirror 5 deflects beam $\epsilon_{22}$ to a polarizing beam splitter 6, which combines it with beam $\epsilon_{21}$. Polarizing beam splitters 8,6, mirrors 7,5, half-wave plate 42 and Faraday rotator 44 together form an optical diode that produces a non-reciprocal optical loss that is greater for optical beams propagating along the propagation direction of loop beam components $\epsilon_{21}$ and $\epsilon_{22}$ than for optical beams propagating in the opposite direction.

The Faraday rotator 44 is a non-reciprocal optical element that rotates the polarization of an optical beam that passes through it by +45 degrees, regardless of which direction the beam is propagating. By contrast, the half-wave plate 42 is a reciprocal optical element. The direction of polarization rotation for a beam that passes through the half-wave plate 42 is dependent on the beam's propagation direction.

The Faraday rotator 44 and half-wave plate 42 are adjusted so that a majority of loop beam components $\epsilon_{21}$ and $\epsilon_{22}$, preferably 90%, is deflected out of the optical loop by a polarizing beam splitter 6. Mirror 5 is adjusted so that $\epsilon_{21}$ and $\epsilon_{22}$ are collinear after the polarizer 6. $\epsilon_{31}$ and $\epsilon_{32}$, the optical beams travelling in a direction counter to loop beam components $\epsilon_{21}$ and $\epsilon_{22}$ are mostly maintained in the optical loop by polarizing beam splitter 8. Only a small portion, preferably 10% or less, of $\epsilon_{31}$ and $\epsilon_{32}$ are deflected out by polarizer 8.

As an illustration of how the optical diode operates, it is assumed that signal beam components $\epsilon_{12}$ and $\epsilon_{11}$ are horizontally and vertically polarized, respectively, with respect to the plane of FIG. 2. If these polarization orientations are not disturbed (resulting in loop beam components $\epsilon_{21}$ and $\epsilon_{22}$ having the same polarization orientations), mirror 5 and polarizing beam splitter 6 will keep loop beam components $\epsilon_{21}$ and $\epsilon_{22}$ in the optical loop by making them collinear. However, when loop beam components $\epsilon_{21}$ and $\epsilon_{22}$ enter Faraday rotator 44 their polarizations are rotated by an adjustable amount up to a maximum of +45 degrees. The polarization rotation imparted by half-wave plate 42 is also adjustable to a maximum of +45 degrees. If the half-wave plate 42 and Faraday rotator 44 were adjusted to rotate the polarizations of the loop beam components by a total of +90 degrees, the polarization orientations of loop beam components $\epsilon_{21}$ and $\epsilon_{22}$ would be orthogonal to the polarization orientations of signal beam components $\epsilon_{11}$ and $\epsilon_{12}$, respectively. This would result in polarizing beam splitter 6 deflecting all of loop beam components $\epsilon_{21}$ and $\epsilon_{22}$ out of the optical loop. Half-wave plate 42 and Faraday rotator 44 are adjusted so that they each impart substantially the same amount of polarization rotation, and the total polarization rotation imparted by both of them combined is adjusted so that polarizing beam splitter 6 deflects approximately 50–99% of loop beam components $\epsilon_{21}$ and $\epsilon_{22}$ out of the optical loop, and mirror 5 makes the rest collinear within the optical loop.

For a beam $\epsilon_3$ travelling in a direction counter to loop beam components $\epsilon_{21}$ and $\epsilon_{22}$, and with orthogonal polarization components $\epsilon_{31}$ and $\epsilon_{32}$ that are oriented similarly to signal beam components $\epsilon_{11}$ and $\epsilon_{12}$, the components $\epsilon_{31}$ and $\epsilon_{32}$ pass through the optical diode with little or no loss. Specifically, when the beam $\epsilon_3$ passes through polarizing beam splitter 6, it is split into orthogonally polarized components $\epsilon_{31}$ and $\epsilon_{32}$. Faraday rotator 44 rotates the polarization orientation of components $\epsilon_{31}$ and $\epsilon_{32}$ by +X degrees (where X is an adjustable amount up to a maximum of 45 degrees as explained above) because it is a non-reciprocal polarization rotator (insensitive to propagation direction). However, when the components pass through half-wave plate 42 their polarization orientation is rotated by -X degrees because the half-wave plate 42 is a reciprocal polarization rotator, and components $\epsilon$_and $\epsilon$_are travelling in a direction counter to loop beam components $\epsilon_{21}$ and $\epsilon_{22}$. This rotates the polarization of components $\epsilon_{31}$ and $\epsilon_{32}$ back to their original polarization orientation prior to entering polarizing beam splitter 6. As a result, polarizing beam splitter 6 maintains substantially all of beam components $\epsilon_{31}$ and $\epsilon_{32}$ in the optical loop.

Any kind of optical gain medium which is suitable for amplifying at the wavelength of the input signal is positioned in the optical loop after the optical diode formed by polarizing beam splitters 6,8, mirrors Faraday rotator 44 and half-wave plate 42. The amplifier 5,7, 46 provides optical gain to any optical beam that passes through it.

Relay mirrors 48 and 50 direct loop beam components $\epsilon_{21}$ and $\epsilon_{22}$ to a polarization mixer 52, preferably a half-wave plate. At the polarization mixer 52, the energy from the two loop beam components $\epsilon_{21}$ and $\epsilon_{22}$ are exchanged/mixed to produce loop beam components $\epsilon_{51}$ and $\epsilon_{52}$. The loop beam component $\epsilon_{51}$ contains spatial information from both signal beam components $\epsilon_{21}$ and $\epsilon_{22}$, and thus from $\epsilon_{11}$ and $\epsilon_{12}$. Similarly, loop beam component $\epsilon_{52}$ contains spatial information from $\epsilon_{11}$ and $\epsilon_{12}$ as well. A pair of mirrors 60 and 62 direct beams $\epsilon_{51}$ and $\epsilon_{52}$ to the nonlinear cell 26 at an angle with respect to beam $\epsilon_1$. In the nonlinear cell 26, loop beam components $\epsilon_{51}$ and $\epsilon_{52}$ optically interfere with signal beam components $\epsilon_{11}$ and $\epsilon_{12}$, respectively, and form two sets of gratings in the nonlinear medium 28 (one for each of the two orthogonal polarization components). Because $\epsilon_{51}$ contains spatial information from $\epsilon_{12}$ as well as $\epsilon_{11}$, the gratings in medium 28 will carry this information and thus the phase of the scattered beams from these two separate gratings will be locked with respect to each other. This phase locking will ensure vector phase conjugation.

The intensity of the S and P polarization components ($\epsilon_{21}$ and $\epsilon_{22}$) of the loop beam at the nonlinear cell 26 are designated $I_{2,s}$ and $I_{2,p}$, respectively. For proper phase conjugation of the polarization of the depolarized signal beam $\epsilon_1$, the ratio $I_{2,p}/I_{2,s}$ must be adjust properly. This may be done experimentally by rotating the half-wave plate 52 until the proper ratio is achieved.

An oscillation beam $\epsilon_3$, with orthogonally polarized components $\epsilon_{31}$ and $\epsilon_{32}$, builds up from optical noise in the resonator/loop and oscillates in a direction counter to the propagation direction of loop beam components $\epsilon_{21}$ and $\epsilon_{22}$ due to the non-reciprocal loss introduced by the optical diode. A portion of oscillation beam $\epsilon_3$ is diffracted by the gratings in medium 28 and remains in the loop, while preferably a larger portion is transmitted through the gratings and exits the optical loop as phase conjugate output beam $\epsilon_4$.

To obtain high quality phase conjugation fidelity, it is important to eliminate or minimize cross scattering of one polarization from the grating written by the orthogonally polarized pair of beams. In the general case for an arbitrary input signal, the gratings should be separated angularly or spatially, or by using both of these methods. In FIG. 2, spatial separation of the gratings is illustrated. Note that the effectiveness of angular separation effect depends on the length of the nonlinear medium. A special case takes place for very highly aberrated depolarized input beams, when in order to restrict cross scattering an extended length or multilayer nonlinear medium can be used. The medium should be long enough compared to the diffraction length of an individual speckle of the input beam (about 10 times or more). In this case the cell may be placed before the optical diode.

Numerous variations and alternate embodiments will occur to those skilled in the art without departing from the spirit and scope of the invention. Such variations and alternate embodiments are contemplated, and can be made without departing from the spirit and scope of the appended claims.

We claim:

1. A loop phase conjugator, comprising:
   an optically nonlinear medium,
   a polarization separator that separates a signal beam $\epsilon_1$ into two orthogonally polarized signal beam components $\epsilon_{11}$ and $\epsilon_{12}$, and directs said components to said optically nonlinear medium, said signal beam components propagating through said nonlinear medium and emerging from said medium as loop beam $\epsilon_2$ with orthogonally polarized components $\epsilon_{21}$ and $\epsilon_{22}$,
   a polarization mixer positioned to receive said loop beam, said polarization mixer mixing the energy from said orthogonally polarized loop beam components $\epsilon_{21}$ and $\epsilon_{22}$ to output loop beam components $\epsilon_{51}$ and $\epsilon_{52}$,
   relay optics that directs loop beam $\epsilon_2$ back to said nonlinear medium so that loop beam components $\epsilon_{51}$ and $\epsilon_{52}$ intersect and optically interfere with signal beam components $\epsilon_{11}$ and $\epsilon_{12}$, respectively, at said nonlinear medium to form gratings in said nonlinear medium, said relay optics and gratings forming an optical loop,
   an optical diode positioned in said optical loop, said optical diode producing a non-reciprocal optical loss in said optical loop that is greater for optical beams propagating along the propagation direction of loop beam $\epsilon_2$ than for optical beams propagating in the opposite direction, and
   an optical gain medium positioned in said optical loop, said gain medium and optical loop forming a ring laser resonator,
   said optical diode and gain medium positioned in said optical loop so that an oscillation beam $\epsilon_3$, with orthogonally polarized components $\epsilon_{31}$ and $\epsilon_{32}$, builds up from optical noise in said resonator and oscillates in a direction counter to the propagation direction of loop beam $\epsilon_2$, with a portion of oscillation beam $\epsilon_3$ being transmitted by said gratings and exiting said optical loop as phase conjugate output beam $\epsilon_4$.

2. The phase conjugator of claim 1, wherein said polarization mixer mixes the loop beam components $\epsilon_{21}$ and $\epsilon_{22}$ to lock the phase difference between the output beams $\epsilon_{51}$ and $\epsilon_{52}$ equal to the phase difference between the signal beam components $\epsilon_{11}$ and $\epsilon_{12}$.

3. The phase conjugator of claim 1, wherein said nonlinear medium comprises an absorptive medium.

4. The phase conjugator of claim 3, wherein said absorptive medium comprises copper nitrate in an acetone base.

5. The phase conjugator of claim 1, wherein said gain medium comprises an Nd:glass or Nd:YAG amplifier.

6. A loop phase conjugator, comprising:

a nonlinear cell with optically transmissive front and back surfaces, and an optically nonlinear medium between said front and back surfaces, a first polarizing beam splitter and mirror combination positioned to receive a signal beam $\epsilon_1$, separate it into orthogonally polarized components $\epsilon_{11}$ and $\epsilon_{12}$, and direct said components to the front surface of said nonlinear cell so they propagate through said non-linear medium and emerge from the back surface of said nonlinear cell as orthogonally polarized loop beam components $\epsilon_{21}$ and $\epsilon_{22}$, a second polarizing beam splitter and mirror combination positioned in the path of loop beam components $\epsilon_{21}$ and $\epsilon_{22}$, said second polarizing beam splitter and mirror deflecting said loop beam components so that their paths converge, a first reciprocal polarization rotator, positioned between said first and second polarizing beam splitter and mirror combination, that imparts a reciprocal phase shift to said loop beam components $\epsilon_{21}$ and $\epsilon_{22}$, a Faraday rotator positioned between said first and second polarizing beam splitter and mirror combinations that imparts a non-reciprocal phase shift to said loop beam components $\epsilon_{21}$ and $\epsilon_{22}$, said polarizing beam splitter and mirror combinations, first reciprocal polarization rotator and Faraday rotator collectively forming an optical diode that produces a non-reciprocal optical loss that is greater for optical beams propagating along the propagation direction of loop beam components $\epsilon_{21}$ and $\epsilon_{22}$ than for optical beams propagating in the opposite direction, a polarization mixer positioned to receive said loop beam components $\epsilon_{21}$ and $\epsilon_{22}$ after they have propagated through said optical diode, said polarization mixer mixing the energy from said orthogonally polarized loop beam components $\epsilon_{21}$ and $\epsilon_{22}$ to form loop beam component $\epsilon_{51}$ and $\epsilon_{52}$, relay optics that direct loop beam components $\epsilon_{51}$ and $\epsilon_{52}$ to said first polarizing beam splitter and mirror combination, said first polarizing beam splitter and mirror combination directing said loop beam components $\epsilon_{51}$ and $\epsilon_{52}$ to said nonlinear cell so they optically interfere with signal beam components $\epsilon_{11}$ and $\epsilon_{12}$, respectively, at said nonlinear medium to form gratings in said nonlinear medium, said relay optics and gratings forming an optical loop, and an amplifier positioned in said optical loop so that said loop beam components $\epsilon_{21}$ and $\epsilon_{22}$ make at least one amplification pass through said amplifier, said amplifier and optical loop forming a ring laser resonator, said gratings, relay optics, amplifier and optical diode forming a unidirectional laser resonator in which an oscillation beam $\epsilon_3$, with orthogonally polarized components $\epsilon_{31}$ and $\epsilon_{32}$ and a polarization conjugate to $\epsilon_1$, builds up from optical noise and oscillates in a direction counter to the propagation direction of loop beam components $\epsilon_{21}$ and $\epsilon_{22}$, with a portion of oscillation beam $\epsilon_3$ being transmitted by said refractive index gratings, and exiting said nonlinear cell as an output beam $\epsilon_4$.

7. The phase conjugator of claim 6, wherein said Faraday rotator, reciprocal polarization rotator, polarizing beam splitter and mirrors are oriented so that approximately 50–99% of loop beam components $\epsilon_{21}$ and $\epsilon_{22}$ are diverted out of said resonator by said second polarizing beam splitter and mirror combination.

8. The phase conjugator of claim 6, wherein said nonlinear medium comprises an absorptive liquid.

9. The phase conjugator of claim 8, wherein said absorptive liquid comprises copper nitrate in an acetone base.

10. The phase conjugator of claim 6, wherein said gain medium comprises an Nd:glass or Nd:YAG amplifier.

11. The phase conjugator of claim 6, wherein said loop beam components $\epsilon_{21}$ and $\epsilon_{22}$ perform a single amplification pass through said amplifier before being directed to said first polarizing beam splitter and mirror combination by said relay optics.

12. The phase conjugator of claim 6, further comprising a mirror positioned to re-direct said loop beam components $\epsilon_{21}$ and $\epsilon_{22}$ back through said amplifier for a second amplification pass before being directed to said first polarizing beam splitter and mirror combination by said relay optics.

* * * * *